United States Patent [19]

Stewart et al.

[11] 4,314,976
[45] Feb. 9, 1982

[54] PURIFICATION OF NICKEL SULFATE

[75] Inventors: Maxson L. Stewart, Bremen, Ga.; Robert R. Odle, Harvey, La.; William W. Brunson, Carrollton, Ga.

[73] Assignee: Southwire Company, Carrollton, Ga.

[21] Appl. No.: 170,197

[22] Filed: Jul. 18, 1980

[51] Int. Cl.³ .................................................. C01G 53/10
[52] U.S. Cl. ................................... 423/139; 423/146; 423/150; 423/24
[58] Field of Search .................. 423/139, 150, 24, 100, 423/32, 146

[56] References Cited

U.S. PATENT DOCUMENTS 3,794,719 2/1974 Lowenhaupt ........................ 423/139
4,036,639 7/1977 Yurko .................................... 423/24

OTHER PUBLICATIONS

Rhoads et al. in *Proceedings, I.S.E.C. 1977*, vol. 2, C.I.M. (1979) pp. 446-452.
Siemens et al, *Mining Congress Journal*, Jan. (1977), pp. 29-34.
Forward et al. in *Journal of Metals*, Mar. 1955, pp. 2-8.
*Engineering/Mining Journal*, Jan. 1972, pp. 94, 95.
Eliasen, "The S.E.C. Process", *CIM Bulletin*, Feb. 1974, pp. 82-86.

*Primary Examiner*—Brian E. Hearn
*Attorney, Agent, or Firm*—Herbert M. Hanegan; Frank A. Peacock; Robert Steven Linne

[57] ABSTRACT

A process is provided for purification of nickel sulfate via ammoniacal leaching and pH regulated solvent-extraction, while providing for regeneration of the extractant and the leach solution. The process is especially suited for hydrometallurgical extraction of high purity nickel sulfate from residue resulting in the regeneration of spent electrolyte in the electrorefining of secondary copper. According to the process, the starting material is leached in an ammonia solution of selected pH to solubilize the nickel as polyammine sulfate, followed by extracting the solubilized nickel by pH regulated solvent-extraction. The extractant is then stripped and regenerated with sulfuric acid by first scrubbing in a first pH range to remove ions that are more electropositive than nickel, then stripping with sulfuric acid in a second pH range to remove nickel ions, and then regenerating the extractant by stripping in a third pH range to remove ions that are less electropositive than nickel. Finally, high purity nickel sulfate is crystallized from the nickel-loaded stripping solution. Further, the spent ammonia leach solution is preferably regenerated.

14 Claims, 1 Drawing Figure

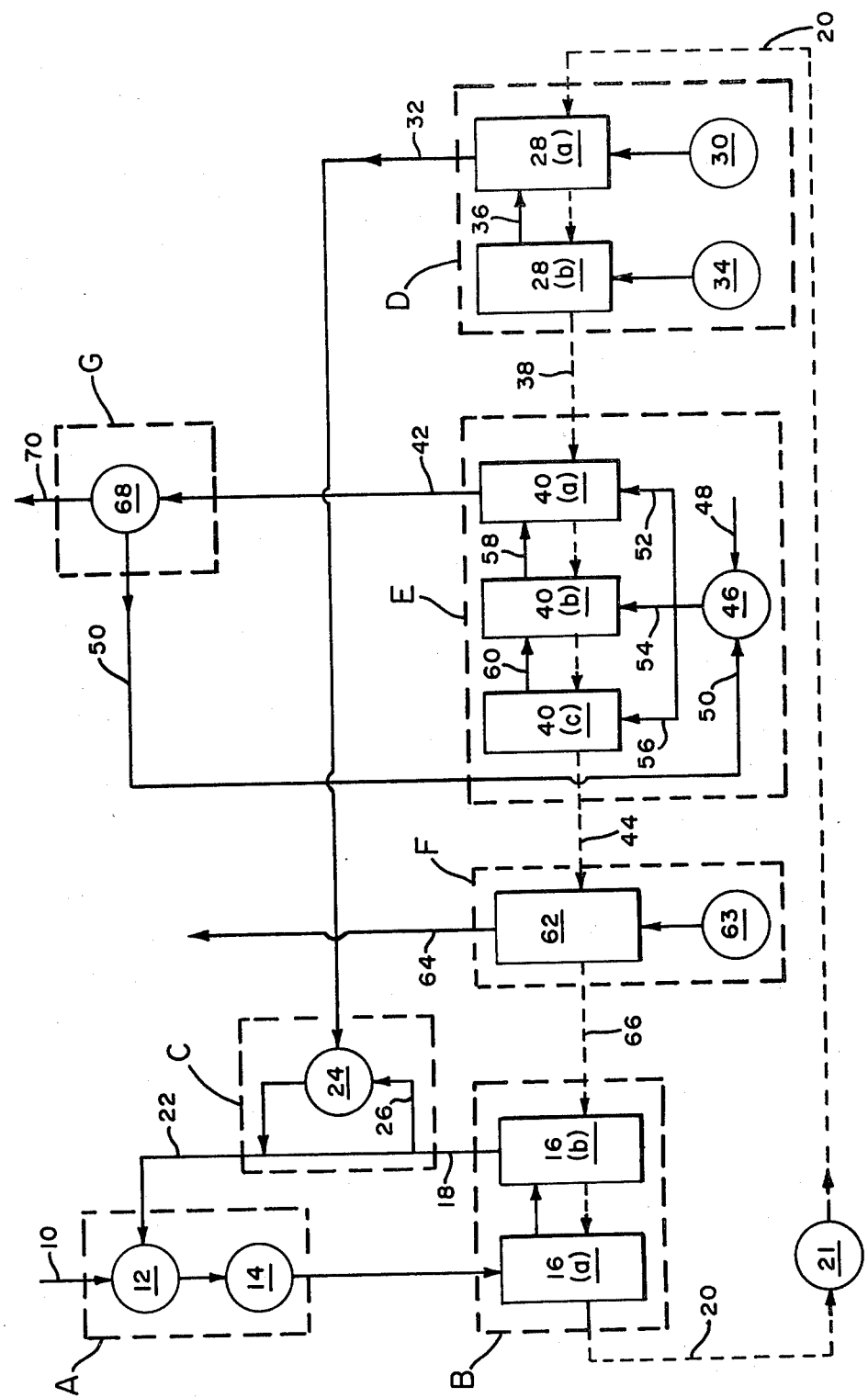

PURIFICATION OF NICKEL SULFATE

BACKGROUND OF THE INVENTION

This invention relates generally to the purification of nickel sulfate by solvent-extraction and specifically to extraction of nickel sulfate from residue resulting from regeneration of spent electrolyte in copper electrorefining.

In the electrorefining of copper, electrolytic corrosion of impure copper anodes releases associated impurities. As high purity copper plates-out at the cathode, those impurities which are less noble than copper are dissolved in the electrolytic solution of sulfuric acid and copper sulfate, while more noble impurities settle to the bottom of the refining tank as anode slime. Typically, the electrolyte is continuously bled-off and made-up at a rate sufficient to maintain the impurity concentration within a maximum acceptable limit. This bleed stream is treated by stagewise evaporative crystallization to recover sulfuric acid leaving a residue containing a large portion of nickel sulfate. As nickel sulfate has substantial market value, the present invention is concerned with the extraction of high purity nickel sulfate from this waste residue.

In the secondary copper refining industry, this residue typically is composed principally of nickel sulfate due to the prevalent association of nickel-containing scrap with copper-containing scrap and is frequently referred to as "crude nickel sulfate". A typical assay of such residue contains roughly 70% metallic sulfate which in turn is roughly 80% nickel sulfate.

Conventional methods for treating this crude nickel sulfate first solubilize the residue in acid, then precipitate impurities leaving nickel sulfate in solution from which it is finally crystallized. The major disadvantage in this approach is that impurities are separated from the nickel sulfate (rather than separating the nickel sulfate from the impurities), thus requiring especially sensitive process control during impurity precipitation if high recovery and high purity is to be realized for the end product.

In contrast, the present invention provides a less sensitive alternative treatment whereby nickel sulfate is directly separated from associated impurities utilizing methods of selective leaching and pH regulated solvent-extraction to recover high purity nickel sulfate. An additional advantage resulting from this approach is that regeneration of the leach solution is made practical.

Of general interest concerning leaching of nickel sulfate are ammoniacal leaching techniques for metal sulfates, such as is disclosed in the article "Chemistry of the Ammonia Pressure Process for Leaching Ni, Cu, and Co from Sherritt Gordon Sulphide Concentrates", Journal of Metals, March 1955, hereby incorporated by reference, wherein various metal salts are selectively leached via metal ammine complexing.

Of general interest in the present invention concerning solvent-extraction of nickel sulfate is the process briefly described in the article "New Recovery Process Can Yield both Electrolytic Nickel and Copper", Engineering and Mining Journal, 94, January 1972, wherein copper and then nickel are serially extracted from spent copper-refining electrolyte utilizing General Mills' LIX-64N (TM) organic extractant. Also of general interest as another example of use of this type of extractant is the extraction process disclosed in U.S. Pat. No. 3,794,719 "Reduction of Nickel Contamination by Zinc in Alpha-Hydroxy-Oxime Extraction" issued Feb. 26, 1974, wherein coextraction of zinc is suppressed by a multistage extractant loading procedure.

SUMMARY OF THE INVENTION

Accordingly, a process is provided for purification of nickel sulfate via ammoniacal leaching and pH regulated solvent-extraction, while providing for regeneration of the extractant. The process is especially suited for extraction of high purity nickel sulfate from residue crystallized from spent electrolyte resulting in the electrorefining of base metals, preferably copper and most preferably secondary copper. The process comprises the following steps:

(a) providing as a starting material nickel sulfate in admixture with associated impurities;

(b) leaching the starting material in an aqueous ammonia solution of concentration at least about sufficient to solubilize the nickel as polyammine sulfate; and then separating the loaded leach solution from undissolved residue; then (c) extracting the nickel from the leach solution by contacting the leach solution with a solvent-extractant; the extractant being characterized as having pH sensitive exchange-active hydrogen ions such that with increasing basic pH of the aqueous phase the extractant is progressively loaded with increasingly electropositive ions and with decreasing acidic pH stripping is in the reverse order; the pH of the leach solution having been adjusted via ammonia concentration sufficiently for loading of nickel; and then separating the loaded solvent-extractant from the depleted leach solution; then (d) scrubbing the solvent-extractant with sulfuric acid to strip ions that are more electropositive than nickel ions from the extractant, the amount of the acid being adjusted such that the pH of the spent scrub solution is sufficiently acidic to approach the pH range for stripping of nickel ions; followed by separation of the spent scrubbing solution from the solvent-extractant; then (e) stripping the nickel as sulfate by contacting the scrubbed solvent-extractant with sulfuric acid, the amount of acid being adjusted such that the pH of the nickel-loaded stripping solution is in the range wherein nickel-loaded sites of the extractant are regenerated; followed by separation of the nickel-loaded stripping solution from the solvent-extractant; then (f) regenerating the depleted solvent-extractant by contacting with sulfuric acid to strip ions that are less electropositive than nickel ions from the extractant, the amount of acid being adjusted such that the pH of the waste solution is substantially less than 1; and, after separation of the waste solution, recycling the regenerated solvent-extractant to step (c); and then (g) crystallizing nickel sulfate from the nickel-loaded stripping solution.

Preferably, the process further comprises:

(h) regenerating the depleted leach solution of step (c) by reacting the ammonium sulfate of the solution with a base having a substantially insoluble sulfate salt to precipitate sulfate; and, after separating the precipitate, recycling the leach solution to step (b).

BRIEF DESCRIPTION OF THE DRAWING

Further details are given below with reference to the accompanying flowchart, illustrating a preferred mode of the invention.

DESCRIPTION OF THE PREFERRED EMBODIMENTS

Referring more particularly to the flowchart, it is seen that the overall process of the invention may be divided broadly into seven basic operations, as indicated by dashed circumscriptions A through G. In Unit A, impure nickel sulfate starting material is solubilized by ammonia leaching. In Unit B, the solubilized nickel is extracted from the loaded leach solution by pH regulated solvent-extraction. In Unit C, the spent leach solution is regenerated. In Unit D, the loaded extractant is acid scrubbed in a first pH range to remove ions more electropositive than nickel. In Unit E, the scrubbed extractant is acid stripped in a second pH range to remove nickel as nickel sulfate. In Unit F, the nickel-stripped extractant is further acid stripped in a third pH range to remove ions less electropositive than nickel and thereby to regenerate the extractant. Finally, in Unit G, high purity nickel sulfate is crystallized from the nickel-loaded stripping solution.

Impure nickel sulfate at 10 is introduced into the extraction process. As discussed above, an especially appropriate starting material is crude nickel sulfate obtained as the residue from evaporative crystallization in the regeneration of spent electrolyte in the electrorefining of copper, especially secondary copper. Such electrolyte when fresh is typically an aqueous solution of about 200 g/l sulfuric acid and 40 g/l copper sulfate. Typically, the nickel sulfate residue will be in admixture with copper sulfate and sulfates of other metals less noble than copper, as well as various impurities characteristically soluble in copper electrorefining. A representative crude nickel sulfate was found to contain about 20% nickel, 1% copper, 1% iron, 0.5% zinc, 50% sulfate, and 10% sulfuric acid. The crude sulfate residue will usually contain entrained sulfuric acid which optionally may be removed by agitated water washing. The wash water to solids ratio should be sufficient for a low enough acid concentration such that a significant portion of the nickel sulfate is not redissolved, for example regarding the above sample a ratio (by weight) of at least about 2 was found to be satisfactory. In any event, the washing step is not required since subsequent steps in the process will accommodate entrained acid in the starting material.

In Unit A, the impure nickel sulfate is leached at 12 in an aqueous ammonia solution of concentration at least about sufficient to solubilize the nickel as polyammine sulfate, representatively haxammine nickel(II) sulfate. A substantially stoichoimetric proportion and a further amount as needed for pH adjustment (as discussed below) are utilized, and leaching is conducted at ambient conditions with agitation. If the starting material contains entrained acid, then sufficient ammonia must also be present to neutralize such acid. In preferred practice, ammonia concentration is also adjusted according to pH requirements of the extraction step as discussed below and will usually be at least about 9 and preferably about 9.5. In this mode, leaching may be said to be pH regulated. Representative equations of dissolution are as follows:

$$NiSO_4 + 6NH_4OH = Ni(NH_3)_6^{+2} + SO_4^{-2} + 6H_2O \quad (1)$$

$$CuSO_4 + 4NH_4OH = Cu(NH_3)_4^{+2} + SO_4^{-2} + 4H_2O \quad (2)$$

For example, 2 grams of the sample material noted above were leached in 15 ml ammonia solution of 30 g/l concentration at ambient conditions for about 1 hour to dissolve substantially all the nickel and copper. More dilute leach solutions in conjunction with somewhat longer contact times were also found to yield satisfactory results. After dissolution, the loaded leach solution is separated from undissolved residue (principally hydroxides of iron and zinc) by conventional solid-liquid separation at 14, such as water vacuum filtration, and passed to Unit B for solvent-extraction treatment.

In Unit B, the loaded leach solution is mixed with a solvent-extractant at 16 whereby nickel is transferred from the aqueous phase to the organic phase. A typical exchange reaction is as follows:

$$[Ni(NH_3)_6]SO_{4(aq)} + 2RH_{(org)} = R_2Ni_{(org)} + (NH_4)_2SO_{4(aq)} \quad (3)$$

As seen from the foregoing equation, exchange is pH regulated, i.e. increasing basic pH in the aqueous phase tends to drive the equation to the right (extractant loading), while decreasing acidic pH tends to drive the equation to the left (stripping). In the aqueous phase, pH must be sufficiently high for loading nickel ions which implies that ions less electropositive than nickel, such as copper, will be co-extracted. At the upper end of the nickel-loading pH range, ions more electropositive than nickel, such as zinc, iron, and ammonium, will be co-extracted to a minor extent. Accordingly, pH of the leach solution is rendered sufficiently basic by adjustment of ammonia concentration in the leach solution to provide for nickel extraction. During mixing of the leach solution with the extractant, the organic-to-aqueous (O/A) ratio is adjusted according to the loading capacity of the extractant. As show in the flowchart, extraction may be multistage. After sufficient contact time, mixing of the organic and aqueous phases is discontinued and separation allowed. The spent leach solution is passed at 18 to Unit C for regeneration, while the loaded organic is passed at 20 via surge tank 21 to Unit D for scrubbing. As discussed below in connection with Unit F when nickel sulfate crystallization is accomplished by cooling crystallization, the solvent-extractant should be stable at elevated temperatures, representatively about 50° C. Conventional chelate extractants are suitable, such as LIX-65N (beta-hydroxybenzophenonoxime) and LIX-63 (beta-hydroxy-alkyloxime), commercially produced by General Mills, and are well known (cf. R. L. Atwood, J. D. Miller, "Structure and Composition of Commercial Chelate Extractants", Trans. Soc. Mining Eng. AIME, 254:4, 319-23, 1973). Conventional solvents are suitable, such as kerosene or Napoleum (470B also commercially produced by General Mills. To illustrate, loaded leach solution containing about 8.2 g/l nickel and 35 g/l ammonium sulfate at a pH of about 9.5 was contacted with extractant consisting of about 35% LIX-65N in Napoleum 470B for about 3 minutes at an O/A ratio of about 1. After separation of the two phases, the loaded organic contained about 7.6 g/l nickel.

In Unit C, the spent leach solution separated as raffinate at 18 from Unit B is regenerated and recycled at 20 to Unit A for continuous operation. Regeneration at 24 is preferably accomplished by lime boiling substantially according to the following equation:

$$(NH_4)SO_4 + Ca(OH)_2 = 2NH_4OH + CaSO_{4(ppt)} \quad (4)$$

It is noted that in addition to lime, other bases whose sulfate salts are substantially insoluble would serve satisfactorily. Practically, in continuously recycling the raffinate to the leaching step only a selected portion is bled-off at 26 for regeneration. As can be seen from equation (3) in the extraction step, increasing amounts of ammonium sulfate in the leach solution will diminish extraction of nickel. Thus, the bleed and regeneration rate is selected to maintain the concentration of ammonium sulfate in the leach solution within an acceptable range. Finally, before recycling the raffinate to the leaching tank, sufficient ammonia is added to adjust the pH to the range required in the extraction step.

In Unit D, the loaded solvent-extractant from Unit B is acid scrubbed at 28 in a first pH range to strip ions from the extractant that are more electropositive than nickel, as a treatment preliminary to nickel stripping. Generally, scrubbing is accomplished with sulfuric acid solution of selected concentration and amount to adjust the pH of the spent scrub solution so as to approach the pH range for nickel stripping. Practically, scrubbing is multistage to prevent solid formation and carryover of entrained emulsion. As shown in the flowchart, two stage scrubbing is preferred. In the first scrub stage, primarily ammonium ions are scrubbed from the extractant while washing out entrainment from the previous step. Representatively, 200 g/l sulfuric acid at 30 is used. The pH in the aqueous phase is maintained above 7 (nominally about 7.5) at 32 to prevent solid formation (metal ammonium sulfates). In the second scrub stage, metal ions that are more electropositive than nickel, such as iron and zinc, are scrubbed from the extractant, while removing entrainment from stage 1. Representatively, 30 to 40 g/l sulfuric acid at 34 is used. The pH in the aqueous phase is maintained less than about 7 (representatively about 5) at 36 to just above the pH range for significant nickel stripping. The organic phase from stage 2 is passed at 38 to Unit E for nickel stripping, and the aqueous phase is returned to stage 1. The aqueous phase from stage 1 at 32 (primarily ammonium sulfate solution) is passed to Unit C for regeneration and recycle to Unit A.

In Unit E, the scrubbed solvent-extractant from Unit D is stripped at 40 over a second pH range to remove nickel ions from the extractant. Generally, nickel stripping is accomplished with sulfuric acid solution of selected concentration and amount to adjust the pH of the nickel-loaded stripping solutions within the range wherein nickel loaded sites of the extractant are regenerated, but ions being less electropositive than nickel, such as copper, remain loaded on the extractant. Preferably, nickel-stripping is multistage with pH becoming more acidic (toward the lower pH limit for selective nickel stripping) with advancing stages. The organic phase is sequentially passed through stages 1 to 3, while the aqueous phases from stages 2 and 3 are cumulatively returned to stage 1. The nickel-loaded aqueous phase from stage 1 is passed at 42 to Unit G for nickel sulfate crystallization. The nickel stripped extractant is passed at 44 to Unit F for regeneration. Sulfuric acid is preferably supplied to the three stages from a common source such as a surge tank at 46 which receives its supply from a makeup stream of fresh acid at 48 and a recycle stream at 50 from nickel sulfate crystallization in Unit G. Respective acid streams at 52, 54, 56 to the three stages are regulated so as to maintain substantially the desired stagewise pH conditions. Thus, stripping is said to be pH regulated. In the case wherein LIX-65N is used as the extractant, it is preferred to maintain stage 1 at a pH of about 3 at 42, stage 2 at about 1.5 at 58, and stage 3 at about 1 at 60 with a contact time in each stage of about 5 minutes. Representatively, acid concentration is about 28 g/l. Temperature is preferably maintained at about 50° C. as discussed in connection with Unit G.

In Unit F, the nickel-stripped solvent-extractant from Unit E is regenerated at 62 by acid stripping in a third pH range to remove ions that less electropositive than nickel. Generally, the extractant is totally stripped with sulfuric acid solution of concentration and amount sufficient to adjust the pH of the aqueous phase to a value substantially less than 1 at 64, thereby stripping substantially all loaded sites on the extractant. The solvent-extractant thus regenerated is recycled at 66 to Unit B. Preferably, stripping conditions are at ambient with single-stage contact. In a preferred use of the invention wherein the impure nickel sulfate starting material is obtained from the regeneration of spent electrolyte in copper electrorefining, the aqueous phase from Unit F will contain a significant amount of copper sulfate. Thus, the aqueous phase may be advantageously recycled at 64 to the copper electrolyte regeneration process (not shown). In the case wherein LIX-65N is utilized as the extractant, it is preferred to utilize a sulfuric acid concentration of about 200 g/l at 63 with a contact time of about 2 minutes.

In Unit G, the nickel-loaded stripping solution from Unit E is subjected to crystallization at 68 to recover high purity nickel sulfate at 70. Conventional methods of crystallization may be utilized, such as solvent evaporation or cooling crystallization. The high purity product will typically be in the hydrated form, e.g. nickel sulfate hexahydrate. The depleted solution is preferably recycled at 50 to Unit E. In continuous operation, a surge tank is interposed in the feed stream between Units E and G to accommodate unsteady output flow rates from Unit E typical of pH control. Preferably, cooling crystallization is utilized which requires that at least stripping Unit E be maintained at an elevated temperature sufficient to substantially increase nickel sulfate aqueous solubility relative to ambient solubility. Preferably, this elevated precrystallization temperature is about 50° C. for crystallization at ambient, in which case nickel concentration in the crystallizer feedstream will be about 151 g/l for saturation and in the recycle stream from the crystallizer about 126 g/l. The O/A in Unit E is preferably adjusted to cause the crystallizer feed stream to be loaded to about nickel sulfate saturation (contemplating either a batchwise O/A or in continuous operation a time-averaged cyclic O/A). Alternatively the precrystallization temperature may be selected in view of the O/A ratio in Unit E to achieve substantial saturation.

While preferred embodiments of the invention have been illustrated and described, it will be recognized by those skilled in the art that the invention may be otherwise variously embodied and practiced within the scope of the following claims:

What is claimed is:

1. A process for purification of nickel sulfate and copper sulfate from electrolyte in copper electrorefining, comprising:
   (a) providing as a starting material a predominately metallic sulfate residue crystallized from spent electrolyte from copper electrorefining, said residue being further characterized in that the predominate metallic constituent is nickel and in that copper is substantially the least electropositive metallic constituent;

(b) leaching the starting material in an aqueous ammonia solution of concentration at least about sufficient to solubilize said nickel as polyammine sulfate; and then separating the loaded leach solution from undissolved residue; then (c) extracting said nickel from said leach solution by contacting said leach solution with a solvent-extractant; said extractant being characterized as having pH sensitive exchange-active hydrogen ions such that with increasing basic pH of the aqueous phase said extractant is progressively loaded with increasingly electropositive ions and with decreasing acidic pH stripping is in the reverse order; the pH of said leach solution having been adjusted via ammonia concentration sufficiently for loading of nickel; and then separating the loaded solvent-extractant from the depleted leach solution; then (d) scrubbing said solvent-extractant with sulfuric acid to strip ions that are more electropositive than nickel ions from said extractant, the amount of said acid being adjusted such that the pH of the spent scrub solution is sufficiently acidic to approach the pH range for stripping of nickel ions; followed by separation of the spent scrubbing solution from said solvent-extractant; then (e) stripping said nickel as sulfate by contacting said scrubbed solvent-extractant with sulfuric acid, the amount of said acid being adjusted such that the pH of the nickel-loaded stripping solution is in the range wherein nickel-loaded sites of the extractants are regenerated; followed by separation of the nickel-loaded stripping solution from said solvent-extractant; then (f) regenerating said depleted solvent-extractant by contacting with sulfuric acid to strip ions that are less electropositive than nickel ions from said extractant, the amount of said acid being adjusted such that the pH of the waste solution is substantially less than 1; and, after separation of the waste solution, recycling the solution, being substantially copper sulfate aqueous solution, to said copper electrorefining and recycling the regenerated solvent-extractant step (c); and then (g) crystallizing nickel sulfate from said nickel-loaded stripping solution.

2. The process of claim 1 wherein said electrorefining is of secondary copper.

3. The process of claim 1 wherein nickel sulfate is solubilized in step (b) substantially as hexammine nickel-(II) sulfate.

4. The process of claim 1, further comprising:
(h) regenerating the depleted leach solution of step (c) by reacting the ammonium sulfate of said solution with a base having a substantially insoluble sulfate salt to precipitate insoluble sulfates; and, after separating the precipitate, recycling the leach solution to step (b).

5. The process of claim 4 wherein the spent scrub solution of step (d) is added to said depleted leach solution prior to regeneration.

6. The process of claim 5 wherein overall operation is continuous and said spent leach solution is regenerated at a bleed and make-up rate sufficient to maintain a substantially constant concentration of ammonium sulfate.

7. The process of claim 1 wherein said crystallization of step (g) is by solvent evaporation.

8. The process of claim 1 wherein said crystallization of step (g) is by cooling crystallization.

9. The process of claim 8 wherein overall operation is continuous, nickel stripping step (e) is conducted at an elevated temperature sufficient to substantially increase nickel sulfate solubility in aqueous solution relative to solubility at ambient and at an organic-to-aqueous ratio such that the stripping solution is loaded to about nickel sulfate saturation, crystallization is conducted at about ambient temperature, and the depleted solution from step (g) is recycled to step (e).

10. The process of claim 9 wherein nickel stripping is conducted at about 50° C.

11. The process of claim 1, 2, 3, 6, or 9 wherein said extractant of step (c) is a chelate of the beta-hydroxy-oxime type.

12. The process of claim 11 wherein said oxime is beta-hydroxybenzo-phenonoxime, beta-hydroxy-alkyloxime, or a mixture thereof.

13. The process of claim 12 wherein said extractant is LIX-65N and said solvent is Napoleum 470B.

14. The process of claim 13 wherein extractant loading in step (c) is conducted at a pH of about 9.5, scrubbing in step (d) is conducted at a pH of about 5.5 to 7.5, and nickel stripping in step (e) is conducted at a pH of about 1 to 3.

* * * * *